United States Patent
Kleinecke et al.

(10) Patent No.: US 7,880,343 B2
(45) Date of Patent: Feb. 1, 2011

(54) DRIVE ISOLATION TRANSFORMER CONTROLLER AND METHOD

(75) Inventors: John D. Kleinecke, Houston, TX (US); Mike Daskalos, Magnolia, TX (US)

(73) Assignee: Toshiba International Corporation, Houston, TX (US)

( * ) Notice: Subject to any disclaimer, the term of this patent is extended or adjusted under 35 U.S.C. 154(b) by 62 days.

(21) Appl. No.: 12/098,838

(22) Filed: Apr. 7, 2008

(65) Prior Publication Data

US 2009/0251009 A1 Oct. 8, 2009

(51) Int. Cl.
*H01H 3/00* (2006.01)
(52) U.S. Cl. ...................................... 307/412
(58) Field of Classification Search .................. 307/412
See application file for complete search history.

(56) References Cited

U.S. PATENT DOCUMENTS

| | | | |
|---|---|---|---|
| 6,804,127 B2 * | 10/2004 | Zhou | 363/37 |
| 7,092,262 B2 | 8/2006 | Ryan et al. | |
| 7,511,975 B2 * | 3/2009 | Hammond | 363/49 |
| 2008/0185999 A1 * | 8/2008 | Matsukawa et al. | 320/166 |
| 2008/0205101 A1 | 8/2008 | Kleinecke et al. | |

* cited by examiner

*Primary Examiner*—Robert L. Deberadinis
(74) *Attorney, Agent, or Firm*—Banner & Witcoff, Ltd.

(57) ABSTRACT

A transformer controller for a drive isolation transformer is provided. The transformer may include multiple sets of primary windings as an input, and the transformer controller may include multiple branches coupled between a power source and the transformer. Each branch may be coupled to its own primary winding on the transformer, and may include one or more components, such as an isolation switch, a fuse, contactor, or circuit breaker. One or more of the branches may include a pre-charge reactor to limit inrush or capacitor charging current occurring during startup, and may include a pre-charge contactor to remove the pre-charge reactor from the circuit when the startup process has reached a certain level (e.g., the charging or inrush current has dissipated, or a DC bus reaches a charged state).

16 Claims, 4 Drawing Sheets

DRIVE ISOLATION TRANSFORMER CONTROLLER AND METHOD

BACKGROUND

Adjustable speed drives can be used to control the speed at which a machine operates, and commonly incorporate converters having isolation transformers. Power to these transformers is often supplied through a transformer controller having a series of components, such as circuit breakers or switches, contactors and fuses. A current limiting reactor may also be included in the circuit to limit the DC bus capacitor charging current, preventing damage to the capacitors and reducing utility line power disturbances. A conventional approach to limiting DC bus capacitor charging current is discussed below with reference to FIGS. 1 and 2.

FIG. 1 illustrates a conventional drive isolation system 100. The drive isolation system 100 generally couples a three-phase power supply 101 to an end load, such as a motor 102, and includes intermediate circuitry to help provide a desired set of voltages and waveforms to ultimately drive the motor 102. The intermediate circuitry may include a transformer 103 and various components coupled to different secondary windings of the transformer, such as fuses 104, rectifiers 105, DC bus capacitors 106 and inverters 107.

On the input side of the transformer 103, the system may include a transformer controller 108, which is shown in greater detail in FIG. 2. As shown in FIG. 2, the transformer controller 108 includes a manually operated isolation switch 202, fuse 204, main contactor (an electrically-controlled type of switch) 206, precharge reactor 208 and precharge contactor 210. The transformer controller 108 may be controlled by a logic controller 212, such as a programmable device, processor, or control logic circuitry.

During startup operation, or a pre-charge state, the controller 212 causes main contactor 206 to close, while precharge contactor 210 is open. The precharge reactor 208 helps to limit the capacitor charging current that can occur during startup. When the DC bus capacitors (106 in FIG. 1) reach a charged state, the precharge contactor 210 is closed to short out the precharge reactor 208 and remove it from the circuit. After the DC bus capacitors 106 are charged, pre-charge state ends, and the system 100 may enter a post-charge state for normal operations.

One problem with conventional transformer controllers, such as transformer controller 108, is that the kilovolt-ampere (kVA) rating of the components within the transformer controller 108 (e.g., main contactor 206, fuse 204, etc.) must be the same or larger than the kVA rating of the transformer 103. This is particularly disadvantageous when the transformer 106 has a high kVA capacity, because higher rated components are more expensive. There is always a need to lower costs, and a lower-cost transformer controller 108 would be advantageous.

SUMMARY

Some of the systems and features described herein relate, for example, to providing a transformer controller that can be constructed with lower-rated components (e.g., their kilovolt-ampere (kVA) ratings) than in traditional systems.

In some aspects, an improved transformer controller may use a transformer having multiple sets of primary windings, where each set of primary windings drives a lower level of current for the system. The transformer controller may have multiple branches, one for each set of primary windings in the transformer. The branches may be coupled to a common power supply, and respective transformer primary windings, and may each include a contactor.

The system may include a logic controller configured to close the contactor of the first branch, and then to close the contactor of the second branch after the DC bus capacitors have reached a full voltage state. The logic controller may be hard-wired logic circuitry, or may be reprogrammable devices, such as a programmable processor or a programmable logic controller (PLC). The logic controller may include, or may operate with, one or more computer-readable media (e.g., hard drive, compact disk, flash memory, etc.) storing computer-executable instructions that cause the controller to perform the various steps and functions described herein.

In some embodiments, the first branch may include pre-charge circuitry, such as a pre-charge reactor and a pre-charge contactor coupled in parallel with the pre-charge reactor. The logic controller may open the pre-charge contactor during a precharge, and then close the pre-charge contactor. The pre-charge circuitry may be present in multiple branches, or may only be present in one branch, such as the first branch.

With the use of multiple primary windings, each branch of the transformer controller may handle a smaller level of current, and may be made of lower-rated components (e.g., lower-rated fuses, switches and contactors).

Additional features described herein will be addressed in greater detail below. The above summary generally addresses many of the features described herein, but is not intended to limit the scope of this disclosure or identify features of greater importance. Although an improved drive isolation system is used as an example herein, it should be noted that the techniques described are equally applicable to other systems.

DETAILED DESCRIPTION

Figure 3:
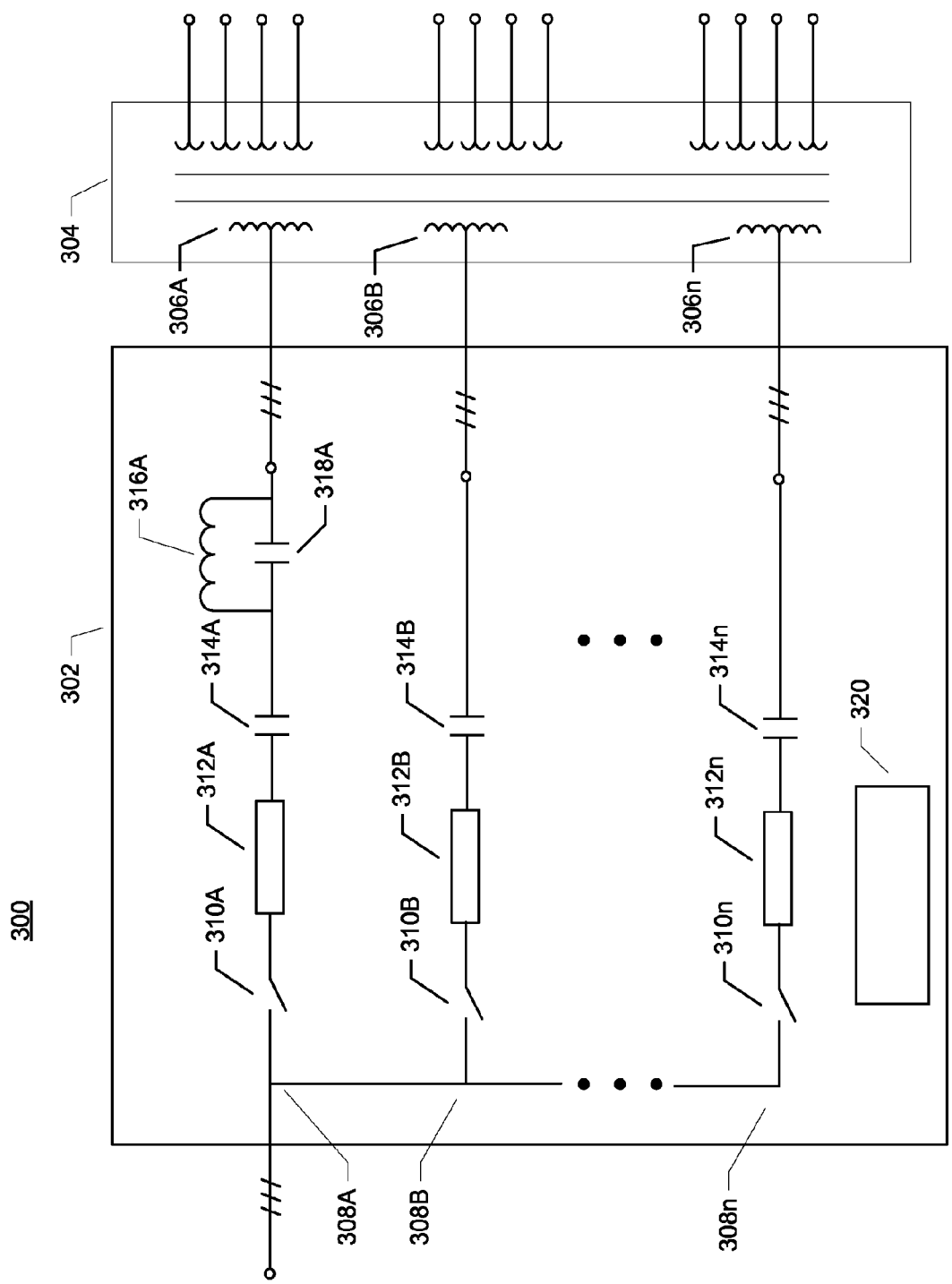
FIG. 3 illustrates an example of a new drive isolation system having a new transformer controller system described herein.

FIG. 3 illustrates an example of an improved drive isolation system 300. The drive isolation system 300 includes a transformer controller 302, and a multi-wound transformer 304. FIG. 3 omits reference numerals in common with FIG. 1 and omits discussion of elements in common with FIG. 1, such as the elements on the secondary side of the transformer 304.

The transformer 304 may include multiple distinct sets of primary (input) windings that are insulated from one another (e.g., electrically parallel sets of windings). The transformer controller 302 may be coupled to the multiple primary windings 306A, 306B, . . . 306n of the transformer 304. In this example, the transformer controller 302 includes a first branch 308A and one or more additional branches 308B . . . 308n that are electrically parallel with one another, although each branch is connected to a different, corresponding one of the primary windings. The first branch may include a switch 310A, fuse 312A, main contactor 314A, precharge reactor 316A, precharge contactor 318A, coupled as shown, all of which may be under the control of the logic controller 320 (which itself may be a programmable device, controller, and/ or logic circuitry). The logic controller 320 may also include one or more computer-readable media, such as a memory, hard drive, optical disk, etc., storing computer-executable instructions to cause the logic controller 320 to perform any of the various steps, actions and functions described herein.

Each of the one or more additional branches 308B ... 308n may include similar components as the first branch 308A, including a switch 310, a fuse 312, and main contactor 314. The precharge circuity (precharge reactor 316A and contactor 318A), however, may be omitted from the additional branches. The various components in the branches may have a lower kVA rating than those used in the FIG. 1 configuration, which may allow for lower part costs. The operation of these branches will be explained below.

Figure 4:
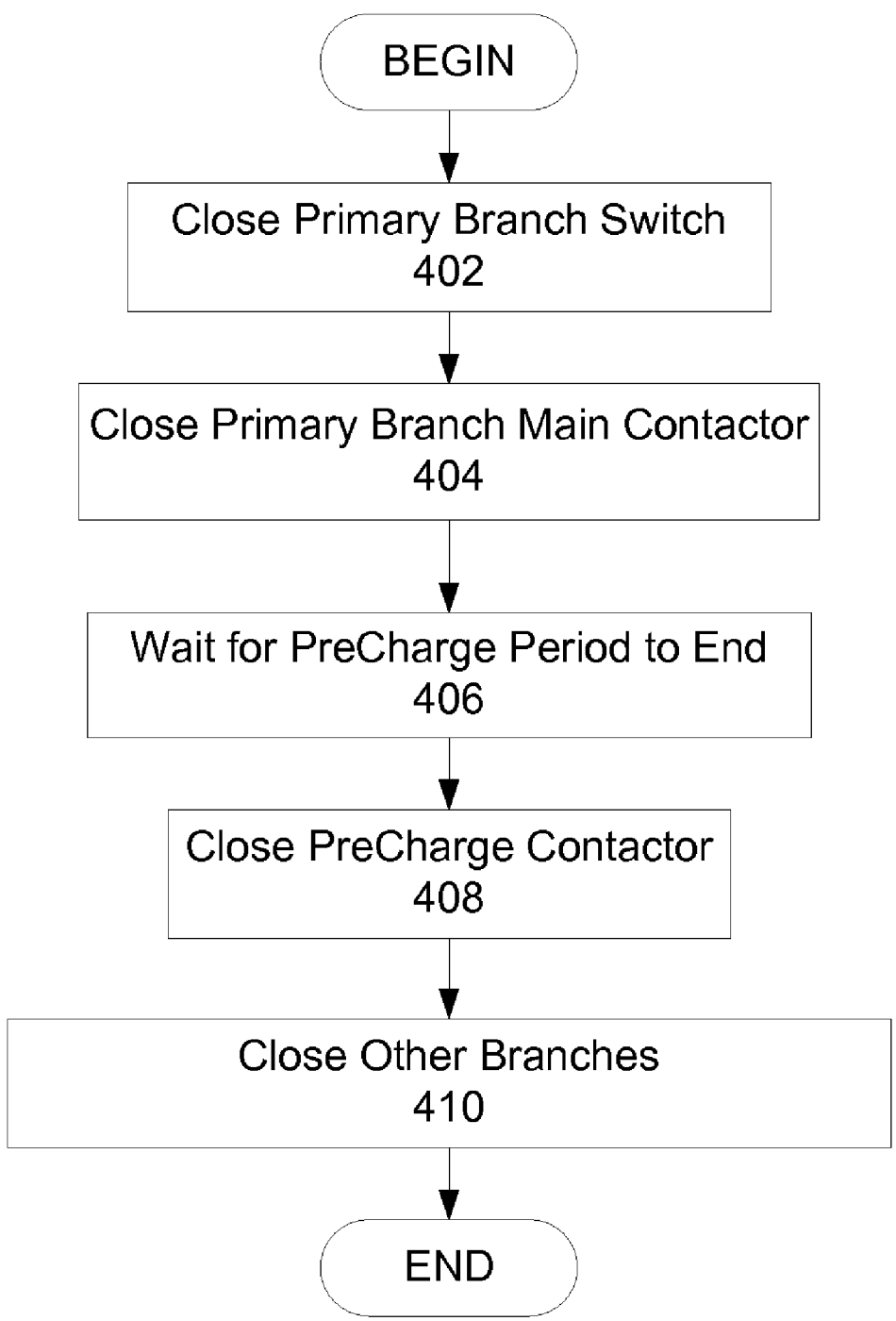
FIG. 4 illustrates a flow diagram of an example of a method for controlling the sequence of operation of a transformer controller as illustrated in FIG. 3.

FIG. 4 illustrates a flow diagram of a method for controlling a transformer controller 302. For startup in step 402, all of the branch switches 310A . . . 310n are closed. These isolation switches may generally be manually operated and may be closed before any operation is done by the logic controller. In step 404, the logic controller 320 may instruct the first branch's main contactor 314A to close, and may keep the precharge contactor 318A open to allow the precharge reactor 316A to limit capacitor charging current.

Then, in step 406, the logic controller 320 may wait until the precharge period has ended. During the precharge period, the charging (or inrush) current is dissipating on the DC bus; the DC bus voltage is rising to its steady-state level; and the primary voltage of the transformer is rising to its steady-state level. Any one of these events may be monitored to determine when the precharge period has ended (e.g., when charging current has dissipated, when the DC bus voltage is at steady-state, or when the transformer has reached its steady-state level). For example, a feedback circuit (not shown) may be used by the logic controller to monitor the DC bus voltage and/or primary winding current using any desired current and/or voltage measuring circuit. Alternatively, the controller may simply wait a sufficient amount of time to allow the DC bus to be charged and/or the charging current to have dissipated. When the precharge period has ended, the logic controller 320 may instruct the precharge contactor 318A to close, thereby short-circuiting the precharge reactor 316A to remove it from the circuit.

After the precharge contactor 318A has been closed, the logic controller 320 may then begin a process 410 to sequentially bring the other branches on line, one at a time or all at the same time.

The system 300 advantageously permits lower rated components to be used in the transformer controller 302, since each branch uses a lower level of current. For instance, the fuses 312, main contactors 314, and pre-charge reactor 316 and contactor 318 may have a lower kVA rating as compared with conventional systems due to the arrangement described in the system 300. The kVA rating of each of the components in the transformer controller 302 may be based on the number of primary windings 306A, 306B ... 306n. For instance, if the transformer 304 includes three sets of windings, then the kVA rating of each of the components in the first branch 308A and additional branches 308B, 308C (not shown) can be the kVA rating of the transformer 304 divided by three. Hence, there is a 1/n relationship between the kVA rating of the transformer 304 and the minimum kVA rating of components within the transformer controller 302, where n is the number of primary windings 306 of the transformer 304 (two or more). Lower kVA rated components, such as contactors and fuses, are less expensive than higher kVA rated components, thus resulting in cost savings to the end user.

The configuration shown in FIG. 3 and described above may be modified as desired. For example, the overall number of branches in the transformer controller 302 may be adjusted. For instance, two or more primary windings may be used to obtain the benefits described herein. As another example, the various component placements may be rearranged. The switch/contactor types and placement may also be changed. For example, the switch, fuse and contactor arrangement 310, 312 and 314 may be replaced with a drawout circuit breaker. Additionally, the precharge circuit (e.g., precharge reactor 316 and 318) may have a different contactor 318 arrangement to remove the reactor 316 from the circuit (e.g., an additional contactor may be placed in series with the reactor 316, and opened when contactor 318 is closed), or the precharge contactor and reactor could be removed completely if there are enough primary windings that the impedance of a single winding is sufficient to limit the capacitor charging current.

Other circuit elements may also be present in the system as illustrated. For example, other resistances, inductances and capacitances present in the system may exist as well, even though they are not depicted in the FIG. 3 schematic.

Figure 1:
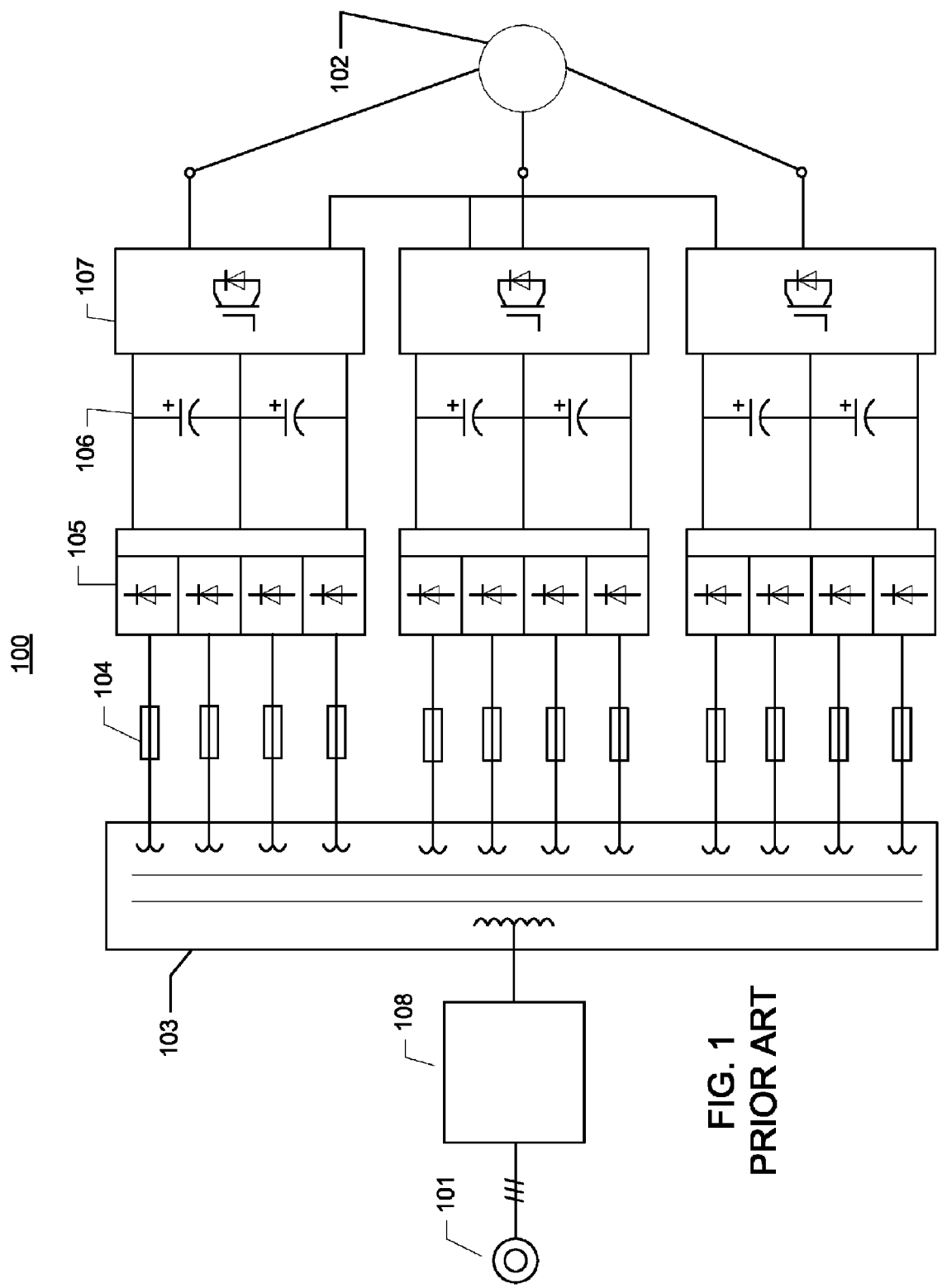
FIG. 1 illustrates a conventional drive isolation system.
Figure 2:
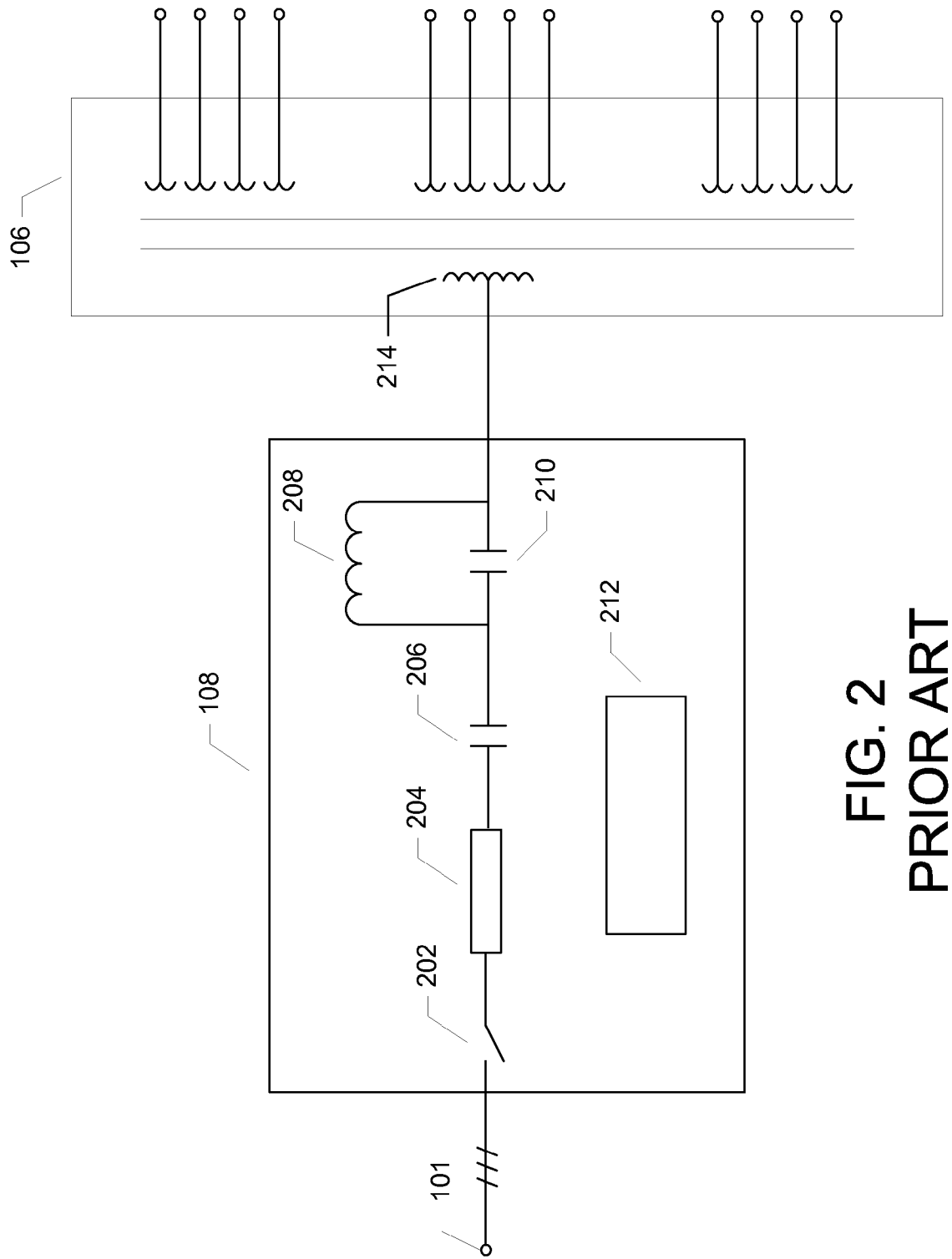
FIG. 2 illustrates a conventional transformer controller used in the system of FIG. 1.

Additionally, components on the secondary side of the transformer 304 may be identical to those shown in FIG. 1, or those components may also be modified as desired. For example, different loads may be used, different inverter configurations, and other changes may be made. For example, control circuitry and smoothing filters may be added.

FIG. 4 illustrates an example process, but the various steps may be altered as desired. For example, some steps may be rearranged, or removed altogether. For example, steps 408 and 410 may be combined, or one may be removed, or they can be replaced with a simple timer that is set to wait for a sufficient amount of time.

The various features, examples and embodiments described above are not intended to limit the scope of the present application, and many of the components may be divided, combined and/or subcombined with one another as desired. Accordingly, the scope of the present patent should only be defined by the following claims.

The invention claimed is:

1. A transformer controller system, comprising:
   a first branch configured to be coupled with a power supply and a first three-phase primary winding of a transformer, the first branch comprising a contactor; and
   a second branch configured to be coupled with the power supply and a second three-phase primary winding of the transformer, the secondary branch comprising a contactor; and
   a logic controller configured to perform the following:
      close the contactor of the first branch;
      determine when a precharge period has concluded; and
      close the contactor of the second branch after the precharge period has concluded.

2. The system of claim 1, wherein said logic controller is configured to determine when said precharge period has concluded by measuring whether the first three-phase primary winding of the transformer has been energized to a steady-state level.

3. The system of claim 1, wherein said logic controller is configured to determine when said precharge period has concluded by measuring when an inrush current has dissipated.

4. The system of claim 1, wherein said logic controller is configured to determine when said precharge period has concluded by measuring when a DC bus voltage has reached a predetermined level.

5. The system of claim 1, wherein the first branch further comprises:
  a pre-charge reactor; and
  a pre-charge contactor coupled in parallel with the pre-charge reactor, wherein the logic controller is configured to:
  open the pre-charge contactor when closing the first contactor of the first branch;
  close the pre-charge contactor after a DC bus coupled to the transformer has reached a predetermined charged state; and
  close the contactor of the second branch after the first three-phase primary winding of the transformer has been energized and the precharge period has concluded.

6. The system of claim 5, wherein the second branch does not have a pre-charge reactor.

7. The system of claim 1, wherein a kilovolt-ampere (kVA) rating of a component of the primary branch is at least a kVA rating of the transformer divided by the number of branches in the transformer controller system that are connected to primary windings of the transformer.

8. The system of claim 1, wherein each branch includes a fuse.

9. The system of claim 1, wherein each branch includes an isolation switch.

10. The system of claim 1, wherein each branch includes a circuit breaker.

11. A method comprising:
  closing a switch in a first branch between a power source and a first three-phase primary winding of a transformer while keeping a switch in a second branch between the power source and a second three-phase primary winding of the transformer open; and
  closing a switch in the second branch after the first three-phase primary winding of the transformer has been energized and a DC bus voltage has reached a predetermined level.

12. The method of claim 11, further comprising:
  using a pre-charge reactor to limit current in the first branch before the inrush current has dissipated; and
  closing a second switch that is in the first branch and parallel to the pre-charge reactor after a DC bus voltage has reached a predetermined level.

13. The method of claim 11, wherein a plurality of branches other than the first branch are coupled between the power source and corresponding sets of three-phase primary windings of the transformer, further comprising sequentially switching said plurality of branches to bring the sequentially-switched branches online.

14. A drive system, comprising:
  a transformer having a plurality of distinct electrically parallel primary windings;
  a plurality of branches, each branch coupled between a power source and a separate one of the primary windings, and each branch having a switch; and
  a controller configured to control the switches to sequentially activate the branches during startup of the drive system, where a second one of said branches is activated responsive to a primary transformer winding coupled to a first one of said branches becoming energized and a DC bus level reaching a predetermined level.

15. The drive system of claim 14, wherein a first one of said branches includes a pre-charge circuit, and a second one of said branches does not include a pre-charge circuit.

16. The drive system of claim 15, wherein said pre-charge circuit includes a pre-charge reactor, and a pre-charge contactor electrically parallel to the pre-charge reactor, and said controller is configured to close the pre-charge contactor after the first one of said branches has been energized and any inrush current has dissipated.

* * * * *